United States Patent
Kurokawa

(10) Patent No.: US 9,330,285 B2
(45) Date of Patent: May 3, 2016

(54) DEVICE MANAGEMENT SYSTEM AND DEVICE MANAGEMENT METHOD

(71) Applicant: Kaname Kurokawa, Chiba (JP)

(72) Inventor: Kaname Kurokawa, Chiba (JP)

(73) Assignee: RICOH COMPANY, LIMITED, Tokyo (JP)

( * ) Notice: Subject to any disclaimer, the term of this patent is extended or adjusted under 35 U.S.C. 154(b) by 268 days.

(21) Appl. No.: 13/958,830

(22) Filed: Aug. 5, 2013

(65) Prior Publication Data

US 2014/0043144 A1     Feb. 13, 2014

(30) Foreign Application Priority Data

Aug. 7, 2012   (JP) ................... 2012-175298

(51) Int. Cl.
| | | |
|---|---|---|
| *H04L 29/08* | (2006.01) | |
| *G06K 7/00* | (2006.01) | |
| *G06F 9/445* | (2006.01) | |

(52) U.S. Cl.
CPC ............. *G06K 7/0008* (2013.01); *G06F 9/445* (2013.01); *G06F 9/44505* (2013.01); *H04L 67/00* (2013.01); *H04L 67/18* (2013.01); *H04L 67/303* (2013.01)

(58) Field of Classification Search
None
See application file for complete search history.

(56) References Cited

U.S. PATENT DOCUMENTS

| | | | | |
|---|---|---|---|---|
| 7,789,308 | B2 * | 9/2010 | Droms et al. ................ | 235/451 |
| 2003/0217150 | A1 * | 11/2003 | Roese et al. ................ | 709/225 |
| 2007/0176782 | A1 * | 8/2007 | Mohalik .................... | 340/572.1 |
| 2009/0222545 | A1 | 9/2009 | Yuki | |
| 2010/0205281 | A1 * | 8/2010 | Porter et al. ................ | 709/220 |

FOREIGN PATENT DOCUMENTS

| | | |
|---|---|---|
| JP | 2005-208808 | 8/2005 |
| JP | 2009-238203 | 10/2009 |

* cited by examiner

*Primary Examiner* — Brian Zimmerman
*Assistant Examiner* — Sara Samson
(74) *Attorney, Agent, or Firm* — Oblon, McClelland, Maier & Neustadt, L.L.P.

(57) ABSTRACT

A device management system includes a device management apparatus and a device managed by the device management apparatus. The device management apparatus includes a positional-information acquiring module configured to acquire positional information on a location of the device; a device-setting information acquiring module configured to acquire device setting information indicative of device setting corresponding to the location indicated in the acquired positional information; and a transmitter configured to transmit the acquired device setting information. The device includes a device control module configured to perform control based on the device setting indicated in the device setting information transmitted from the device management apparatus.

12 Claims, 8 Drawing Sheets

FIG.3

| AREA | READER/WRITER ID | POLICY NAME | DEVICE TYPE | POLICY CONTENT |
|---|---|---|---|---|
| FIRST FLOOR | RW0001 | Policy1 | PC | INTERNET ACCESS PROHIBITED, PROJECTOR_1 USABLE, ACCESSIBLE TO DOCUMENT GROUP 1 |
| SECOND FLOOR | RW0002 | Policy2 | PROJECTOR | NONE |
| | | | PC | MFP_1 USABLE, ACCESSIBLE TO DOCUMENT GROUP 2 |
| | | | MFP | COLOR PRINTING PROHIBITED, DUPLEX PRINTING |
| | | | TABLET | INTERNET ACCESS PROHIBITED |
| LABORATORY | RW0003 | Policy3 | PC | ACCESSIBLE TO DOCUMENT GROUP 3 |
| MEETING ROOM | RW0004 | Policy4 | PC | NO ACCESSIBLE DOCUMENT |
| ... | ... | ... | ... | ... |

| ASSET NUMBER | DEVICE NAME | MODEL NUMBER | REGISTRATION DATE | IC TAG ID | READER/ WRITER ID | ADMINIS- TRATOR |
|---|---|---|---|---|---|---|
| S0100 | Projector_1 | serial_1 | XXXX/XX/XX | I0001 | RW0001 | User_A |
| S0200 | PC_1 | serial_2 | XXXX/XX/XX | I0002 | RW0002 | User_B |
| S0300 | MFP_1 | serial_3 | XXXX/XX/XX | I0003 | RW0003 | User_B |
| ⋮ | ⋮ | ⋮ | ⋮ | ⋮ | ⋮ | ⋮ |

DEVICE MANAGEMENT SYSTEM AND DEVICE MANAGEMENT METHOD

CROSS-REFERENCE TO RELATED APPLICATIONS

The present application claims priority to and incorporates by reference the entire contents of Japanese Patent Application No. 2012-175298 filed in Japan on Aug. 7, 2012.

BACKGROUND OF THE INVENTION

1. Field of the Invention

The present invention relates to a device management system and a device management method.

2. Description of the Related Art

The introduction of information technology (IT) has progressed in recent years, and IT devices (information-processing equipment) such as personal computers (PCs), displays, and printing equipment have been introduced in various environments such as offices.

Such IT devices may be managed as IT assets (fixed assets) in some cases, and for example, Japanese Patent Application Laid-open No. 2005-208808 discloses a technology to manage, by a management server, the locations of IT assets using integrated circuit (IC) tags.

In the conventional technology, however, there has been no idea to use the location of a device managed by a device management apparatus or the like when device setting is made. Consequently, when the setting of a device is made corresponding to the location of the device in the conventional technology, the device management apparatus or the like is unable to handle it, necessitating manual setting by a user. However, the number of devices to be managed has a tendency to increase, and thus such a method is not practical.

Therefore, there is a need for a device management system and a device management method that are capable of making the device setting according to the location of the device.

SUMMARY OF THE INVENTION

According to an embodiment, there is provided a device management system that includes a device management apparatus and a device managed by the device management apparatus. The device management apparatus includes a positional-information acquiring module configured to acquire positional information on a location of the device; a device-setting information acquiring module configured to acquire device setting information indicative of device setting corresponding to the location indicated in the acquired positional information; and a transmitter configured to transmit the acquired device setting information. The device includes a device control module configured to perform control based on the device setting indicated in the device setting information transmitted from the device management apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table illustrating an example of a device setting table according to the embodiment;

DETAILED DESCRIPTION OF THE PREFERRED EMBODIMENT

With reference to the accompanying drawings, an embodiment of the invention will be described in detail.

The configuration of a device management system according to the embodiment will be described first.

Figure 1:
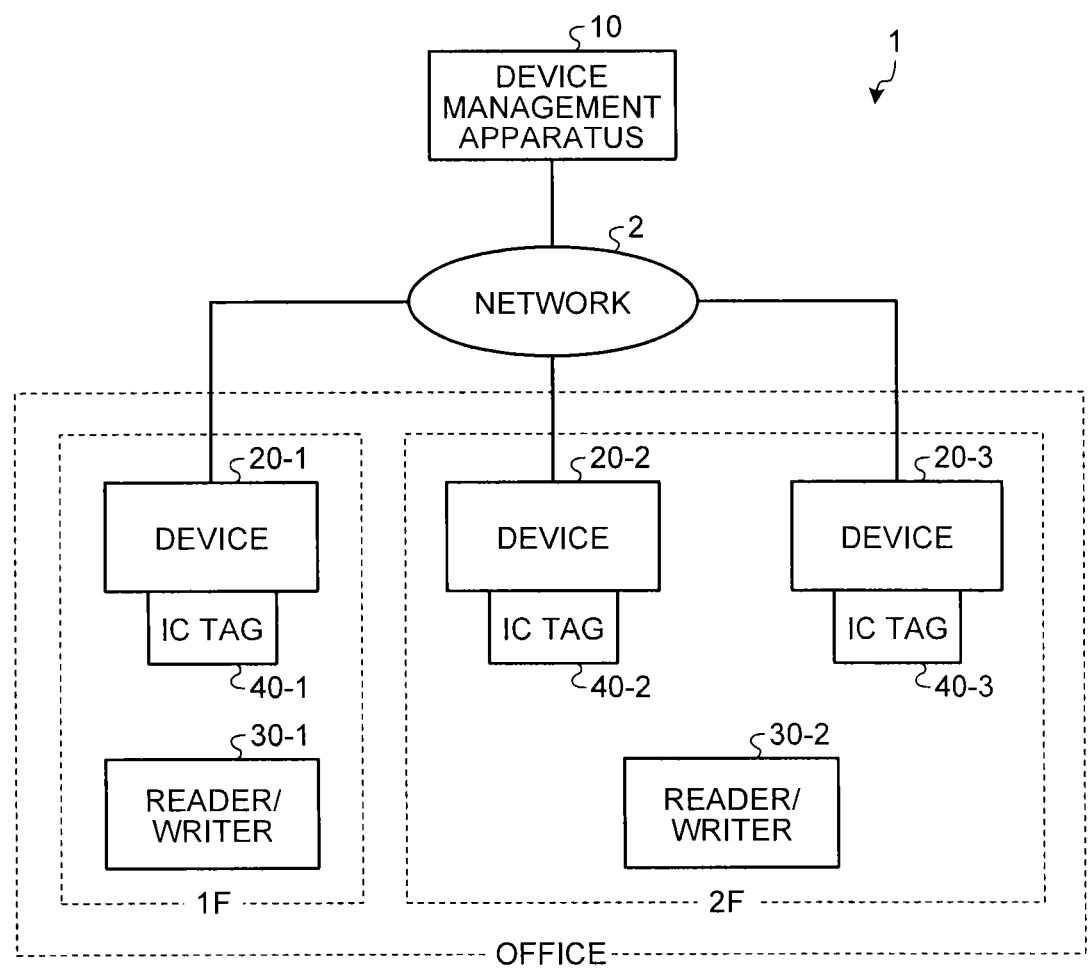
FIG. 1 is a block diagram illustrating an example of the configuration of a device management system according to an embodiment.

FIG. 1 is a block diagram illustrating an example of the configuration of a device management system 1 according to the embodiment. As illustrated in FIG. 1, the device management system 1 includes a device management apparatus 10, devices 20-1 to 20-3, and readers/writers 30-1 and 30-2. The device management apparatus 10 and the devices 20-1 to 20-3 are connected via a network 2. The network 2 can be constructed, for example, by the Internet and a local area network (LAN).

In the embodiment, it is assumed that the device management apparatus 10 is provided in a service center of a service provider who provides a device management service, and the devices 20-1 to 20-3 and the readers/writers 30-1 and 30-2 are provided in a service reception area. The installation site of the device management apparatus 10, however, is not restricted to the service center, and it may be a service reception area or the like. The service reception area is an area in which the devices to be managed are installed, and for example, corresponds to an office of a company who receives the device management service.

Moreover, in the embodiment, it is assumed that the device 20-1 and the reader/writer 30-1 are disposed on the first floor of an office that is a service reception area, and the devices 20-2 and 20-3 and the reader/writer 30-2 are disposed on the second floor of the office. The readers/writers 30-1 and 30-2 (examples of a writing device) are further assumed, for example, to be in a form of a gate and fixedly disposed on the first floor and on the second floor of the office at the respective entrances thereof. However, the embodiment is not restricted to this.

The device management apparatus 10 manages the devices 20-1 to 20-3, and can be implemented by a PC or the like installed with a later-described device management program. Although the devices 20-1 to 20-3 are exemplified in FIG. 1, the devices to be managed by the device management apparatus 10 are not restricted thereto.

Each of the devices 20-1 to 20-3 only needs to be a device that is connectable to the network 2. The devices 20-1 to 20-3 correspond to, for example, information processing devices such as a personal computer (PC) and a tablet device; image forming devices such as a printer, a copying machine, a multifunction peripheral (MFP), a scanner, and a facsimile; and various electronic devices such as a projector, a camera, an air conditioner, a refrigerator, a florescent light, a vending machine, and a handheld device. The MFP has at least two functions out of a copying function, a printing function, a scanner function, and a facsimile function. Although the embodiment is exemplified with a situation in which the device 20-1 is a projector, the device 20-2 is a PC, and the device 20-3 is an MFP, the embodiment is not restricted thereto.

Integrated circuit (IC) tags 40-1 to 40-3 (examples of a storage device) are provided (attached) to the devices 20-1 to 20-3, respectively. The IC tag 40-1 is provided to the device 20-1. Thus, written in the IC tag 40-1 is a reader/writer ID (an example of writing-device identification information that identifies a writing device) of the reader/writer 30-1 fixedly disposed on the first floor of the office on which the device 20-1 is disposed. The IC tags 40-2 and 40-3 are provided to the devices 20-2 and 20-3, respectively. Thus, written in the IC tags 40-2 and 40-3 is the reader/writer ID of the reader/writer 30-2 fixedly disposed on the second floor of the office on which the devices 20-2 and 20-3 are disposed.

In the following description, when it is not necessary to distinguish the devices 20-1 to 20-3 individually, the devices 20-1 to 20-3 may simply be referred to as the device 20. Similarly, when it is not necessary to distinguish the readers/writers 30-1 and 30-2 individually, the readers/writers 30-1 and 30-2 may simply be referred to as the reader/writer 30, and when it is not necessary to distinguish the IC tags 40-1 to 40-3 individually, the IC tags 40-1 to 40-3 may simply be referred to as the IC tag 40.

Figure 2:
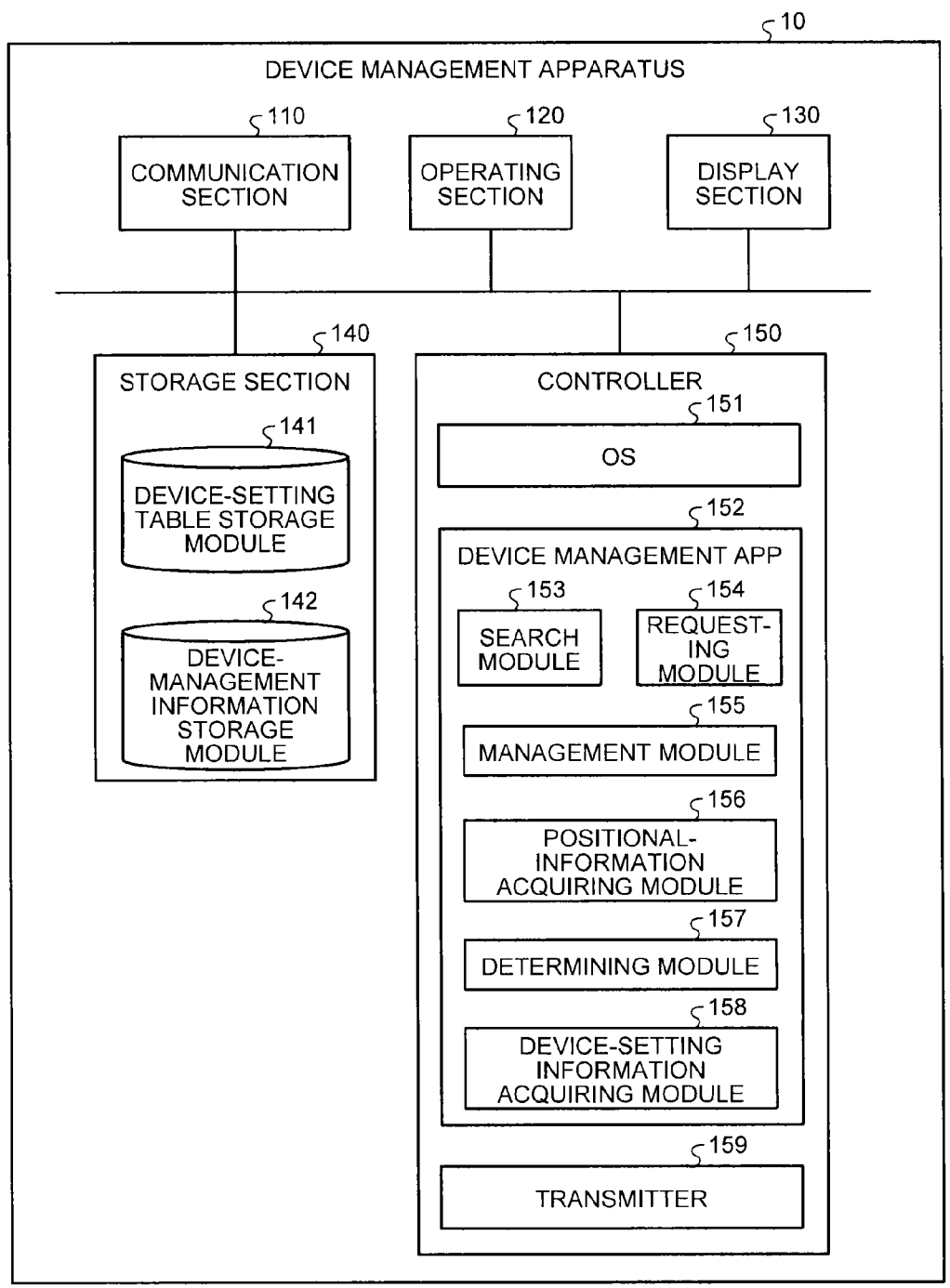
FIG. 2 is a block diagram illustrating an example of the configuration of a device management apparatus according to the embodiment.

FIG. 2 is a block diagram illustrating an example of the configuration of the device management apparatus 10 according to the embodiment. As illustrated in FIG. 2, the device management apparatus 10 includes a communication section 110, an operating section 120, a display section 130, a storage section 140, and a controller 150.

The communication section 110 performs communication with an external device such as the device 20 via the network 2, and can be implemented by a network interface card (NIC) or the like.

The operating section 120 receives various operations, and can be implemented by an input device such as a keyboard, a mouse, a touch pad, and a touch panel.

The display section 130 displays thereon various screens, and can be implemented by a display device such as a liquid crystal display and a touch panel display.

The storage section 140 stores therein various computer programs such as an operating system (OS) program and the device management program executed by the device management apparatus 10 and various types of data for a device control program and others used for various types of processing performed in the device management apparatus 10. The storage section 140 can be implemented by at least any of the storage devices that are capable of storing therein the programs and the data magnetically, optically, or electrically, for example, a hard disk drive (HDD), a solid state drive (SSD), a memory card, an optical disc, a read only memory (ROM), and a random access memory (RAM). The storage section 140 includes a device-setting table storage module 141 and a device-management information storage module 142. The device-management information storage module 142 will be described later.

The device-setting table storage module 141 stores therein a device setting table in which positional information on the location of the device 20 and device setting information indicative of device setting are associated with each other. FIG. 3 is a table illustrating an example of the device setting table according to the embodiment. In the example illustrated in FIG. 3, the device setting table is a table in which an area, a reader/writer ID, a policy name, a device type, and policy content are associated with one another. At least the reader/writer ID is the positional information, while the policy name, the device type, and the policy content are the device setting information in the example illustrated in FIG. 3. The positional information and the device setting information are not restricted thereto. The policy is an example of the device setting, and in the embodiment, each policy defines the policy content in a format such as a file for each device type.

The area indicates an area within the office, the reader/writer ID indicates an ID for the reader/writer 30 fixedly disposed in the area, the policy name indicates the name of the policy, the device type indicates the type of the device 20, and the policy content indicates the content of the policy. Although it is assumed that the reader/writer ID for the reader/writer 30-1 is defined as "RW0001" and the reader/writer ID for the reader/writer 30-2 is defined as "RW0002" in the embodiment, the embodiment is not restricted thereto.

The controller 150 controls the respective sections and modules of the device management apparatus 10, and can be implemented by a control device such as a central processing unit (CPU). The controller 150 includes an OS 151, a device management application 152 (hereinafter referred to as a device management app 152), and a transmitter 159. The controller 150 activates (executes) the OS program and the device management program stored in the storage section 140 to implement the OS 151 and the device management app 152, respectively, as software.

The OS 151 controls the respective sections and modules of the device management apparatus 10 (in detail, the hardware and software of the device management apparatus 10), and can be implemented by basic software, for example, Windows (registered trademark) and UNIX (registered trademark).

The device management app 152 manages the devices of managing target using a general-purpose protocol that is generally used in device management such as Simple Network Management Protocol (SNMP), and includes a search module 153, a requesting module 154, a management module 155, a positional-information acquiring module 156, a determining module 157, and a device-setting information acquiring module 158.

The search module 153 searches for the device 20. The search module 153 transmits, for example, a request of SNMP or Packet Internet Groper (PING) to an IP address of a search destination via the OS 151 to search for a new (not yet designated as a managing target) device 20.

When the new device 20 is searched for by the search module 153, the requesting module 154 requests the transmitter 159 to distribute (transmit) the device control program to the device 20 and notifies the transmitter 159 of an asset number (an example of device identification information that identifies the device 20) to be set for the device 20. The asset number is a number not yet stored (registered) in the device-management information storage module 142, which will be described later.

When the transmitter 159 is requested to distribute the device control program from the device management app 152, the transmitter 159 acquires the device control program from the storage section 140, sets the asset number notified by the device management app 152, and then distributes (transmits) the device control program to the device 20 requested via the OS 151.

The management module 155 manages the devices of managing target. The management module 155 acquires, from the device 20 to which the device control program is distributed from the transmitter 159, the asset number, a device name, a model number, a registration date, and administrator information of the device 20 via the OS 151. The management module 155 then stores the asset number, the device name, the model number, the registration date, and the administrator information acquired in the device-management information storage module 142 in association with one another. Consequently, the asset number, the device name, the model number, the registration date, and the administrator information of the device 20 are stored in the device-management information storage module 142, and the device 20 is newly defined (registered) as a device to be managed by the device management apparatus 10 (the device management app 152). The management module 155 then periodically performs communication with the device 20 of managing target so as to manage the device 20 of managing target via the network 2.

The positional-information acquiring module 156 acquires positional information on the location of the device 20 of managing target. More specifically, the positional-information acquiring module 156 acquires, from the device 20 of managing target via the OS 151, the reader/writer ID, the asset number of the device 20, and an IC tag ID (an example of storage-device identification information that identifies a storage device) of the IC tag 40 that are written (stored) in the IC tag 40.

Figures 4, 5:
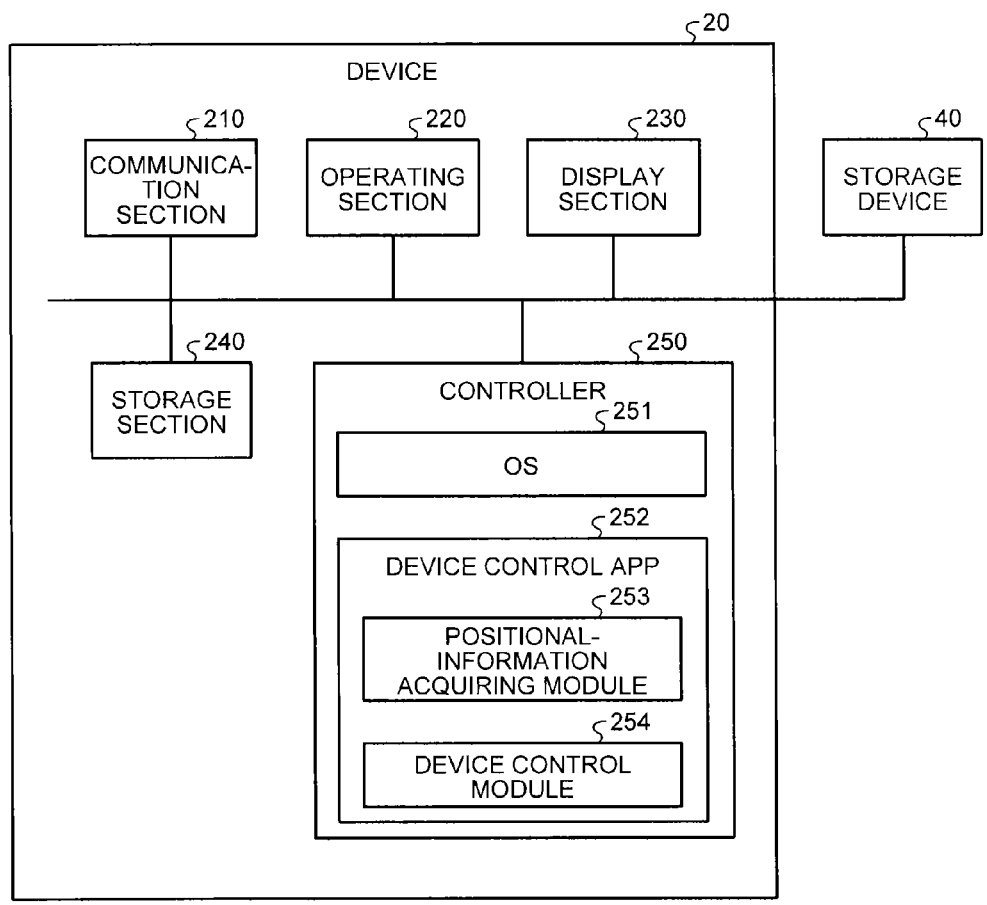
FIG. 4 is a table illustrating an example of device management information according to the embodiment.
FIG. 5 is a block diagram illustrating an example of the configuration of a device in the embodiment.

Next, the device-management information storage module 142 will be described. The device-management information storage module 142 stores therein device management information such as the positional information for the device 20 of managing target. FIG. 4 is a table illustrating an example of the device management information in the embodiment. In the example illustrated in FIG. 4, the device management information includes the asset number, the device name, the model number, the registration date, the IC tag ID, the reader/writer ID, and the administrator information in association with one another. In the example illustrated in FIG. 4, the asset number is the device identification information, the IC tag ID is the storage-device identification information, and the reader/writer ID is the positional information. However, the device management information is not restricted thereto.

The asset number, the device name, the model number, the registration date, and the administrator information are registered (stored) when the management module 155 defines the device 20 as a managing target of the device management apparatus 10 (the device management app 152), and the IC tag ID and the reader/writer ID are registered (stored) by the determining module 157, which will be described later.

In the embodiment, it is assumed that the asset numbers for the devices 20-1, 20-2, and 20-3 are defined as "S0100", "S0200", and "S0300", respectively, and the IC tag IDs for the IC tags 40-1, 40-2, and 40-3 are defined as "I0001", "I0002", and "I0003", respectively. However, the embodiment is not restricted thereto.

The determining module 157 determines whether the location indicated in the positional information acquired by the positional-information acquiring module 156 is changed. More specifically, when the positional-information acquiring module 156 acquires the positional information, the determining module 157 determines whether the location indicated in the positional information acquired is changed from the location indicated in the positional information already stored in the device-management information storage module 142. After determining whether the location indicated in the acquired positional information is changed, the determining module 157 updates the location indicated in the positional information already stored in the device-management information storage module 142 with the location indicated in the positional information acquired.

For example, when the positional-information acquiring module 156 acquires the reader/writer ID and others from the device 20, the determining module 157 determines whether the reader/writer ID acquired is changed from the reader/writer ID of the device 20 already stored in the device-management information storage module 142 in association with the asset number that matches the asset number of the device 20 acquired. Subsequently, after the determination, the determining module 157 updates the reader/writer ID of the device 20 already stored in the device-management information storage module 142 with the reader/writer ID acquired.

The determining module 157 determines whether the device indicated in the device identification information and the storage device indicated in the storage-device identification information acquired by the positional-information acquiring module 156 match the device indicated in the device identification information and the storage device indicated in the storage-device identification information already stored in the device-management information storage module 142, respectively, and when they match, the determining module 157 then determines whether the location indicated in the positional information acquired is changed.

For example, the determining module 157 determines whether the asset number of the device 20 and the IC tag ID of the IC tag 40 acquired by the positional-information acquiring module 156 match the asset number of the device 20 and the IC tag ID of the IC tag 40 already stored in the device-management information storage module 142, respectively, and when they match, the determining module 157 determines whether the location indicated in the positional information acquired is changed.

At the time the reader/writer ID of the device 20 and the IC tag ID of the IC tag 40 are first acquired by the positional-information acquiring module 156, the reader/writer ID of the device 20 and the IC tag ID of the IC tag 40 are not stored in the device-management information storage module 142. The determining module 157 therefore determines that the reader/writer ID of the device 20 is changed, and then registers (stores) the reader/writer ID of the device 20 and the IC tag ID of the IC tag 40 acquired by the positional-information acquiring module 156 in association with the asset number that matches the asset number of the device 20 acquired by the positional-information acquiring module 156.

The device-setting information acquiring module 158 acquires the device setting information indicative of the device setting corresponding to the location indicated in the positional information acquired by the positional-information acquiring module 156, and requests the transmitter 159 to transmit the device setting information to the device 20. More specifically, when the location indicated in the positional information acquired by the positional-information acquiring module 156 is changed, the device-setting information acquiring module 158 refers to the device setting table and acquires the device setting information indicative of the device setting corresponding to the location indicated in the positional information acquired by the positional-information acquiring module 156. In more detail, when the location indicated in the positional information acquired by the positional-information acquiring module 156 is changed, the device-setting information acquiring module 158 refers to the device setting table and acquires the difference from the device setting information acquired last time from among pieces of the device setting information indicative of the device setting corresponding to the location indicated in the positional information acquired by the positional-information acquiring module 156.

For example, when the reader/writer ID acquired by the positional-information acquiring module 156 is changed, the device-setting information acquiring module 158 refers to the device setting table and acquires the difference from the policy acquired last time from among the policies corresponding to the reader/writer ID.

When the transmitter 159 is requested to transmit the device setting information by the device management app 152, the transmitter 159 transmits the device setting information to the requested device 20 via the OS 151.

The device management apparatus 10 is not necessary to be configured with all of the above-described sections and modules as essential constituents, and may be configured with a part thereof omitted.

FIG. 5 is a block diagram illustrating an example of the configuration of the device 20 in the embodiment. As illustrated in FIG. 5, the device 20 includes a communication section 210, an operating section 220, a display section 230, a storage section 240, and a controller 250. To the device 20, the IC tag 40 is further provided. In the embodiment, it is assumed that the IC tag 40 is provided to the device 20 via an external interface such as Universal Serial Bus (USB). The embodiment, however, is not restricted to this, and the IC tag 40 may be built in the device 20.

The communication section 210 performs communication with an external device such as the device management apparatus 10, and can be implemented by a NIC or the like.

The operating section 220 receives various operations, and can be implemented by an input device such as a keyboard, a mouse, a touch pad, and a touch panel.

The display section 230 displays thereon various screens, and can be implemented by a display device such as a liquid crystal display and a touch panel display.

The storage section 240 stores therein various computer programs such as an OS program and the device control program executed by the device 20 and data and others used for various types of processing performed in the device 20 such as the asset number, the device name, the model number, the registration date, and the administrator information of the device 20. The asset number and the registration date of the device 20 are set by the device management apparatus 10. More specifically, with the device control program being distributed (downloaded) from the device management apparatus 10 to the device 20 and installed in the storage section 240, the asset number and the registration date of the device 20 are stored in the storage section 240. The device name, the model number, the administrator information, and others of the device 20 are stored in the storage section 240 in advance.

The storage section 240 can be implemented by at least any of the storage devices that are capable of storing therein the programs and the data magnetically, optically, or electrically, for example, an HDD, an SSD, a memory card, an optical disc, a ROM, and a RAM.

The controller 250 controls the respective sections of the device 20, and can be implemented by a control device such as a CPU. The controller 250 includes an OS 251 and a device control application 252 (hereinafter referred to as a device control app 252). The controller 250 activates (executes) the OS program and the device control program stored in the storage section 240 to implement the OS 251 and the device control app 252, respectively, as software.

The OS 251 controls the respective sections and modules of the device 20 (in detail, the hardware and software of the device 20), and can be implemented by basic software, for example, Windows (registered trademark) and UNIX (registered trademark).

The device control app 252 manages the device 20, and includes a positional-information acquiring module 253 and a device control module 254.

The positional-information acquiring module 253 acquires the positional information of the device 20, and transmits the positional information to the device management apparatus 10 via the OS 251. More specifically, the positional-information acquiring module 253 acquires the reader/writer ID and the IC tag ID from the IC tag 40 and the asset number from the storage section 240, and then transmits them to the device management apparatus 10 via the OS 251.

The device control module 254 receives the device setting information indicative of the device setting corresponding to the location indicated in the positional information of the device 20 from the device management apparatus 10 via the OS 251, and performs control based on the device setting indicated in the device setting information received. More specifically, the device control module 254 performs control based on the device setting of the device type of the device 20 out of the device setting indicated in the device setting information received. For example, when the device 20 is the device 20-2, the device control module 254 receives Policy 2 (see FIG. 3) and thus performs control based on the policy content for the device type of "PC" out of the policy content indicated in the Policy 2, more specifically, control in which the use of an MFP_1 (the device 20-3) is allowed and the access to a document group 2 out of the documents managed on a server or the like not depicted is allowed.

The device 20 is not necessary to be configured with all of the above-described sections and modules as essential constituents, and may be configured with a part thereof omitted.

Next, the operation of the device management system according to the embodiment will be described. While the following describes the operation of the device management system 1 with the device 20-2 taken for an example, the operation is the same with the other device 20.

Figure 6:
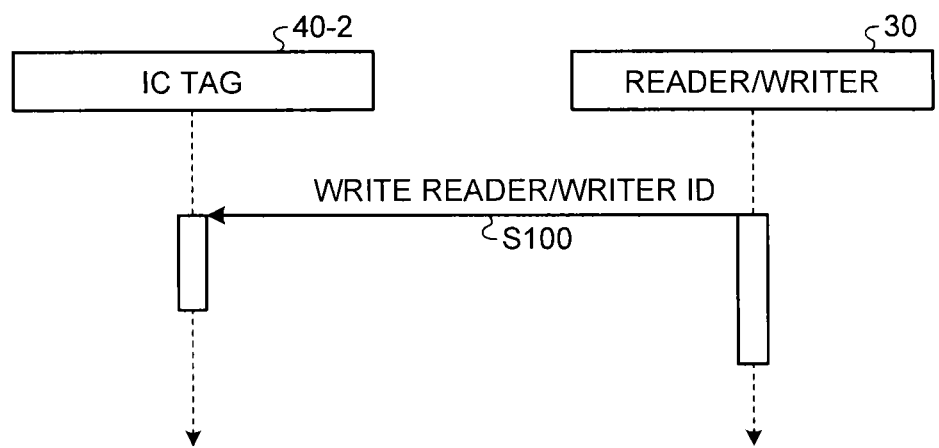
FIG. 6 is a sequence diagram illustrating an example of a reader/writer-ID registration process performed in the device management system according to the embodiment.

FIG. 6 is a sequence diagram illustrating an example of a reader/writer-ID registration process performed in the device management system 1 according to the embodiment. While the process illustrated in FIG. 6 may be performed at any time, in the embodiment, the process is assumed to be performed at the time of the device 20-2 being brought into an area within an office in which the reader/writer 30 is disposed and the device 20-2 passing through the reader/writer 30 (gate) fixedly disposed at the entrance of the area.

When the device 20-2 to which the IC tag 40-2 is provided passes through the reader/writer 30 first, the reader/writer 30 detects the IC tag 40-2 provided to the device 20-2 and writes its own reader/writer ID to the IC tag 40-2 detected (Step S100).

For example, as illustrated in FIG. 1, when the device 20-2 is brought into the second floor of the office, the reader/writer ID "RW0002" is written in the IC tag 40-2 by the reader/writer 30-2. When the device 20-2 is further moved from the condition illustrated in FIG. 1 and brought into the first floor of the office, for example, the reader/writer ID "RW0001" is written (overwritten) in the IC tag 40-2 by the reader/writer 30-1.

Figure 7:
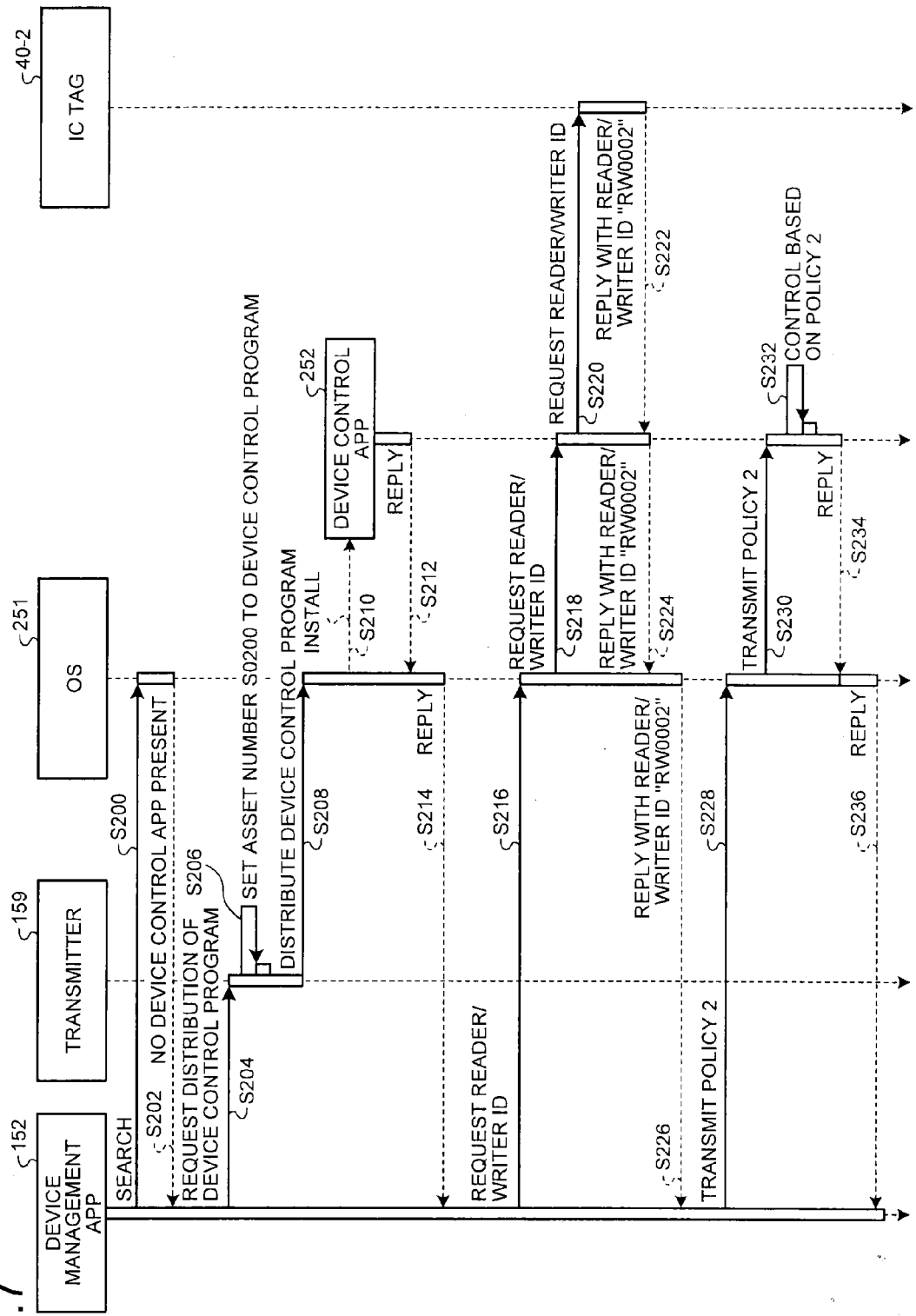
FIG. 7 is a sequence diagram illustrating an example of a device setting process performed for the first time in the device management system according to the embodiment.

FIG. 7 is a sequence diagram illustrating an example of a device setting process performed for the first time in the device management system 1 according to the embodiment.

The search module 153 of the device management app 152 in the device management apparatus 10 first transmits a request to an IP address as a search destination, so as to search for a new device 20 (Step S200). Here, the IP address as the search destination is assumed to be the IP address of the device 20-2 disposed on the second floor of the office.

The OS 251 of the device 20-2 then replies to the device management app 152 as a response to the request, indicating that there is no device control app present (Step S202).

When the device 20-2 is searched for by the search module 153, the requesting module 154 of the device management app 152 then requests the transmitter 159 to distribute the device control program to the device 20-2 and notifies the transmitter 159 of the asset number "S0200" to be set for the device 20-2 (Step S204).

When the transmitter 159 is requested to distribute the device control program from the device management app 152, the transmitter 159 acquires the device control program from the storage section 140, sets the asset number of S0200 notified from the device management app 152 (Step S206), and then distributes the device control program to the requested device 20-2 (Step S208).

Subsequently, when the device control program is distributed from the device management apparatus 10, the OS 251 of the device 20-2 installs the device control program in the storage section 240 (Step S210). Thereby, the asset number "S0200" for the device 20-2 and the registration date thereof are stored in the storage section 240. The OS 251 then activates (executes) the device control program stored in the storage section 240 to implement the device control app 252 as software.

Subsequently, the device control app 252 of the device 20-2 acquires the asset number of S0200, the device name, the model number, and the registration date of the device 20-2 from the storage section 240, and notifies the device management app 152 via the OS 251 (Steps S212 and S214). The management module 155 of the device management app 152 then acquires the asset number of S0200, the device name, the model number, and the registration date from the device control app 252, and stores them in the device-management information storage module 142.

The positional-information acquiring module 156 of the device management app 152 then requests the reader/writer ID from the OS 251 (Step S216).

Subsequently, when the reader/writer ID is requested via the OS 251 (Step S218), the positional-information acquiring module 253 of the device control app 252 requests the reader/writer ID and the IC tag ID from the IC tag 40-2 (Step S220).

The IC tag 40-2 then replies to the device control app 252 with the reader/writer ID "RW0002" written in itself and its own IC tag ID "I0002" (Step S222).

The positional-information acquiring module 253 of the device control app 252 then acquires its own asset number "S0200" from the storage section 240, and replies to the device management app 152 via the OS 251 with the asset number together with the reader/writer ID "RW0002" and the IC tag ID "I0002" replied from the IC tag 40-2 (Steps S224 and S226). The positional-information acquiring module 156 of the device management app 152 acquires the asset number "S0200", the reader/writer ID "RW0002", and the IC tag ID "I0002" from the device control app 252.

The determining module 157 of the device management app 152 then determines that the reader/writer ID of the device 20-2 is changed because the asset number "S0200" is not associated with the reader/writer ID and the IC tag ID in the device-management information storage module 142, and thus stores the asset number "S0200" in association with the reader/writer ID "RW0002" and the IC tag ID "I0002". The device-setting information acquiring module 158 of the device management app 152 then refers to the device setting table illustrated in FIG. 3, for example, and acquires the Policy 2 corresponding to the reader/writer ID "RW0002", and the transmitter 159 transmits the Policy 2 acquired to the OS 251 (Step S228).

Subsequently, when the device control module 254 of the device control app 252 receives the Policy 2 via the OS 251 (Step S230), the device control module 254 performs control based on the policy content for the device type of "PC" out of the policy content indicated in the Policy 2, more specifically, control in which the use of the MFP_1 (the device 20-3) is allowed and the access to the document group 2 out of the documents managed on a server or the like not depicted is allowed (Step S232).

The device control module 254 then replies to the device management app 152 via the OS 251, indicating that the Policy 2 is applied to the device 20-2 (Steps S234 and S236).

Figure 8:
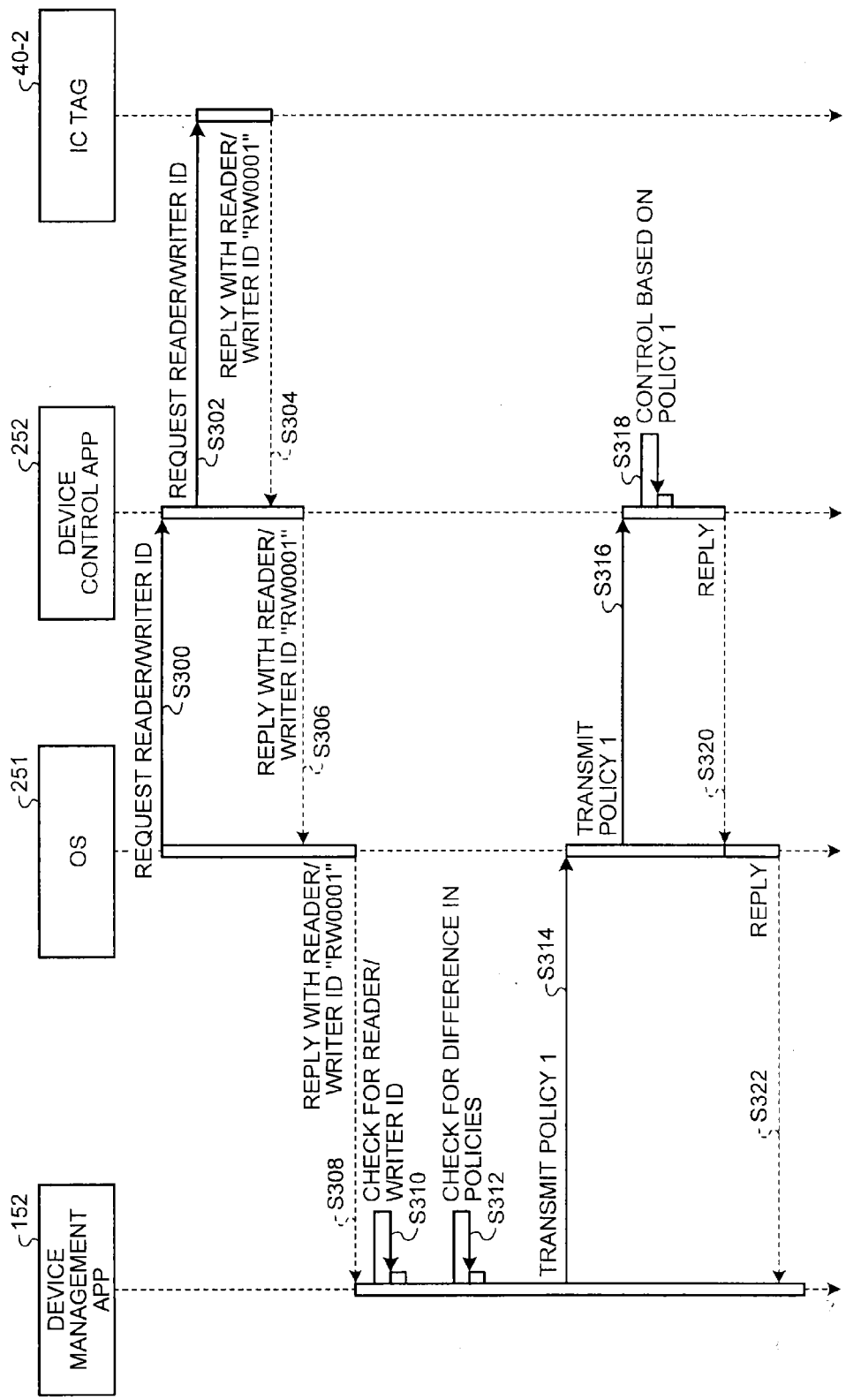
FIG. 8 is a sequence diagram illustrating an example of the device setting process performed for the second and a subsequent time in the device management system according to the embodiment.

FIG. 8 is a sequence diagram illustrating an example of the device setting process performed for the second and subsequent time in the device management system 1 according to the embodiment. In the example illustrated in FIG. 8, described is a situation in which, for example, the device 20-2 is moved from the second floor of the office to the first floor and "RW0002" is overwritten with "RW0001" in the reader/writer ID stored in the IC tag 40-2. The embodiment, however, is not restricted to this. Although the process illustrated in FIG. 8 may be performed at any time, in the present embodiment, the process is assumed to be performed at the time of starting up the device 20-2.

When the device 20-2 is started up and when the positional-information acquiring module 253 of the device control app 252 is requested by the OS 251 for the reader/writer ID (Step S300), the positional-information acquiring module 253 requests the reader/writer ID and the IC tag ID from the IC tag 40-2 (Step S302).

The IC tag 40-2 then replies to the device control app 252 with the reader/writer ID "RW0001" written in itself and its own IC tag ID "I0002" (Step S304).

The positional-information acquiring module 253 of the device control app 252 then acquires its own asset number "S0200" from the storage section 240, and replies to the device management app 152 via the OS 251 with the asset number together with the reader/writer ID "RW0001" and the IC tag ID "I0002" replied from the IC tag 40-2 (Steps S306 and S308). The positional-information acquiring module 156 of the device management app 152 acquires the asset number "S0200", the reader/writer ID "RW0001", and the IC tag ID "I0002" from the device control app 252.

Subsequently, the determining module 157 of the device management app 152 checks that the asset number "S0200" and the IC tag ID "I0002" acquired by the positional-information acquiring module 156 match the asset number "S0200" for the device 20-2 and the IC tag ID "I0002" for the IC tag 40-2 stored in the device-management information storage module 142, respectively. For this, the determining module 157 determines whether the reader/writer ID acquired by the positional-information acquiring module 156 matches the reader/writer ID that is in association with the asset number "S0200" and stored in the device-management information storage module 142 (Step S310).

The reader/writer ID acquired by the positional-information acquiring module 156 is "RW0001" and the reader/writer ID stored in the device-management information storage module 142 is "RW0002", and therefore the determining module 157 updates the reader/writer ID "RW0002" stored in the device-management information storage module 142 with the reader/writer ID "RW0001". The device-setting information acquiring module 158 of the device management app 152 then refers to the device setting table illustrated in FIG. 3, for example, and checks for the difference between the Policy 2 currently applied to the device 20-2 and Policy 1 corresponding to the reader/writer ID "RW0001" (Step S312). However, there is no content in common and there is no difference present between the Policy 1 and the Policy 2, and thus the device-setting information acquiring module 158 acquires the Policy 1 and the transmitter 159 transmits the Policy 1 acquired to the OS 251 (Step S314).

Subsequently, when the device control module 254 of the device control app 252 receives the Policy 1 via the OS 251 (Step S316), the device control module 254 performs control based on the policy content for the device type of "PC" out of the policy content indicated in the Policy 1, more specifically, control in which the access to the Internet is prohibited, the use of Projector_1 (the device 20-1) is allowed, and the access to a document group 1 out of the documents managed on a server or the like not depicted is allowed (Step S318).

The device control module 254 then replies to the device management app 152 via the OS 251, indicating that the Policy 1 is applied to the device 20-2 (Steps S320 and S322).

As described above, in the embodiment, the device management apparatus manages both of the policies corresponding to areas and the locations of devices, and thus the device setting according to the location of the device can be performed. As a consequence, according to the embodiment, the device setting can be performed automatically according to the area in which the device is disposed, which eliminates the need for manual device setting by the user.

Modification

Furthermore, the present invention is not restricted to the above-described embodiment, and thus various modifications are allowed.

For example, in the above-described embodiment, it has been exemplified that the device management apparatus 10 determines whether a device is moved. However, the device 20 may be configured to determine whether the device is moved. In this case, the device 20 only needs to return the positional information and others to the device management apparatus 10 when the device is moved.

In the above-described embodiment, the device management apparatus 10 distributes the device control program. However, by separately providing a server, the server may be configured to perform the processing content for the transmitter 159 in the device management apparatus 10.

Hardware Configuration

Figure 9:
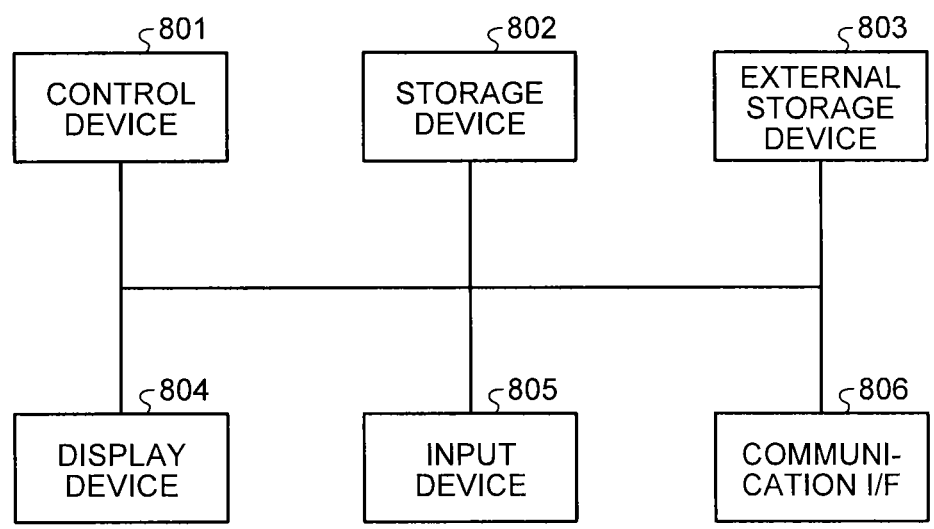
FIG. 9 is a block diagram illustrating an example of the hardware configuration of the device management apparatus and the device according to the embodiment and in a modification thereof.

FIG. 9 is a block diagram illustrating an example of the hardware configuration of the device management apparatus 10 and the device 20 according to the embodiment and the modification thereof. As illustrated in FIG. 9, the device management apparatus 10 and the device 20 according to the embodiment and the modification thereof include a control device 801 such as a CPU, a storage device 802 such as a ROM and a RAM, an external storage device 803 such as an HDD and an SSD, a display device 804 such as a display, an input device 805 such as a mouse and a keyboard, and a communication I/F 806 such as a NIC; and can be implemented with a hardware configuration using an ordinary computer. Moreover, when the device 20 is an image forming apparatus, the device 20 further includes a printing device such as a plotter, and when the device 20 is a projector, the device 20 further includes a projection device such as a projection lens.

The device management program executed by the device management apparatus 10 and the device control program executed by the device 20 according to the embodiment and the modification are provided in a file of an installable format or an executable format stored on a computer readable storage medium such as a compact disc read-only memory (CD-ROM), a compact disc-recordable (CD-R), a memory card, a digital versatile disk (DVD), and a flexible disk (FD).

Furthermore, the device management program executed by the device management apparatus 10 and the device control program executed by the device 20 according to the embodiment and the modification may be stored on a computer connected to a network such as the Internet to be provided by downloading the programs via the network. The device management program executed by the device management apparatus 10 and the device control program executed by the device 20 according to the embodiment and the modification may be provided or distributed via a network such as the Internet. The device management program executed by the device management apparatus 10 and the device control program executed by the device 20 according to the embodiment and the modification may further be configured to be provided being embedded in a ROM or the like in advance.

The device management program executed by the device management apparatus 10 and the device control program executed by the device 20 according to the embodiment and the modification are modularly configured to implement the above-described modules on a computer. In regard to the actual hardware, the control device 801 reads out the programs on the storage device 802 from the external storage device 803 and executes the programs to implement the above-described modules on the computer.

The present invention provides an effect of enabling the setting of a device according to the location of the device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management system, comprising:
a device management apparatus; and
a device managed by the device management apparatus, wherein
the device management apparatus includes
processing circuitry configured to acquire positional information on a location of the device, and acquire device setting information indicative of device setting corresponding to the location indicated in the acquired positional information, and
a transmitter configured to transmit the acquired device setting information, and
the device includes
a control processing circuit configured to perform control based on the device setting indicated in the device setting information transmitted from the device management apparatus, wherein
the processing circuitry is further configured to determine whether the location indicated in the acquired positional information is changed, and acquire the device setting information when the location indicated in the acquired positional information is changed,
the device is provided with a memory, the device management system further includes a writing device which is fixedly disposed in an area in which the device is located and which is configured to write writing-device identification information that identifies the writing device in the memory, the processing circuitry acquires the writing-device identification information written in the memory as the positional information from the device, the device management apparatus further includes a device-management information memory that stores therein device identification information that identifies the device and storage-device identification information that identifies the memory in association with the positional information, the processing circuitry further acquires the device identification information and the storage-device identification information from the device, and the processing circuitry determines whether the device indicated in the acquired device identification information and the memory indicated in the acquired storage-device identification information match the device indicated in the device identification information and the memory indicated in the storage-device identification information stored in the device-management information memory, respectively, and when the devices and the memories match, determines whether the location indicated in the acquired positional information is changed.

2. The device management system according to claim 1, wherein when the processing circuitry acquires new positional information, the processing circuitry determines whether a location indicated in the new positional information is changed from the location indicated in the positional information already stored in the device-management information memory.

3. The device management system according to claim 2, wherein the processing circuitry updates the location indicated in the positional information already stored in the device-management information memory with the location indicated in the new positional information after determining whether the location indicated in the new positional information is changed.

4. The device management system according to claim 1, wherein the device management apparatus further comprises a device-setting table memory that stores therein a device setting table in which the positional information and the device setting information are associated with each other, and the processing circuitry refers to the device setting table and acquires the device setting information indicative of the device setting corresponding to the location indicated in the acquired positional information.

5. The device management system according to claim 4, wherein the processing circuitry refers to the device setting table and acquires a difference from the device setting information acquired last time out of pieces of the device setting information indicative of the device setting corresponding to the location indicated in the acquired positional information when the location indicated in the acquired positional information is changed.

6. The device management system according to claim 1, wherein the device setting information defines a device setting for each device type, and the control processing circuit performs control based on the device setting for the device type out of the device settings indicated in the device setting information.

7. A device management method performed in a device management system including a device management apparatus and a device managed by the device management apparatus, the method comprising:

acquiring, by the device management apparatus, positional information on a location of the device;

acquiring, by the device management apparatus, device setting information indicative of device setting corresponding to the location indicated in the acquired positional information;

transmitting, by the device management apparatus, the acquired device setting information;

performing, by the device, control based on the device setting indicated in the device setting information transmitted from the device management apparatus; and determining, by the device management apparatus, whether the location indicated in the acquired positional information is changed, wherein the acquiring the device setting information is performed when the location indicated in the acquired positional information is changed, wherein the device is provided with a memory, the device management system includes a writing device which is fixedly disposed in an area in which the device is located and which is configured to write writing-device identification information that identifies the writing device in the memory, and the acquiring the positional information includes acquiring the writing-device identification information written in the memory as the positional information from the device, the method further includes storing, in a device-management information memory, device identification information that identifies the device and storage-device identification information that identifies the memory in association with the positional information, the acquiring the positional-information includes acquiring the device identification information and the storage-device identification information from the device, and the determining includes determining whether the device indicated in the acquired device identification information and the memory indicated in the acquired storage-device identification information match the device indicated in the device identification information and the memory indicated in the storage-device identification information stored in the device-management information memory, respectively, and when the devices and the memories match, includes determining whether the location indicated in the acquired positional information is changed.

8. The device management method according to claim 7, wherein when the device management apparatus acquires new positional information, the determining includes determining whether a location indicated in the new positional information is changed from the location indicated in the positional information already stored in the device-management information memory.

9. The device management method according to claim 8, wherein the determining includes updating the location indicated in the positional information already stored in the device-management information memory with the location indicated in the new positional information after determining whether the location indicated in the new positional information is changed.

10. The device management method according to claim 7, wherein
    the device management apparatus includes a device-setting table memory that stores therein a device setting table in which the positional information and the device setting information are associated with each other, and
    the acquiring the device-setting information includes referring to the device setting table to acquire the device setting information indicative of the device setting corresponding to the location indicated in the acquired positional information.

11. The device management method according to claim 10, wherein the acquiring the device-setting information includes referring to the device setting table and acquiring a difference from the device setting information acquired last time out of pieces of the device setting information indicative of the device setting corresponding to the location indicated in the acquired positional information when the location indicated in the acquired positional information is changed.

12. The device management system according to claim 7, wherein
    the device setting information defines a device setting for each device type, and
    the performing includes performing control based on the device setting for the device type out of the device settings indicated in the device setting information.

* * * * *